United States Patent Office 2,771,558
Patented Nov. 20, 1956

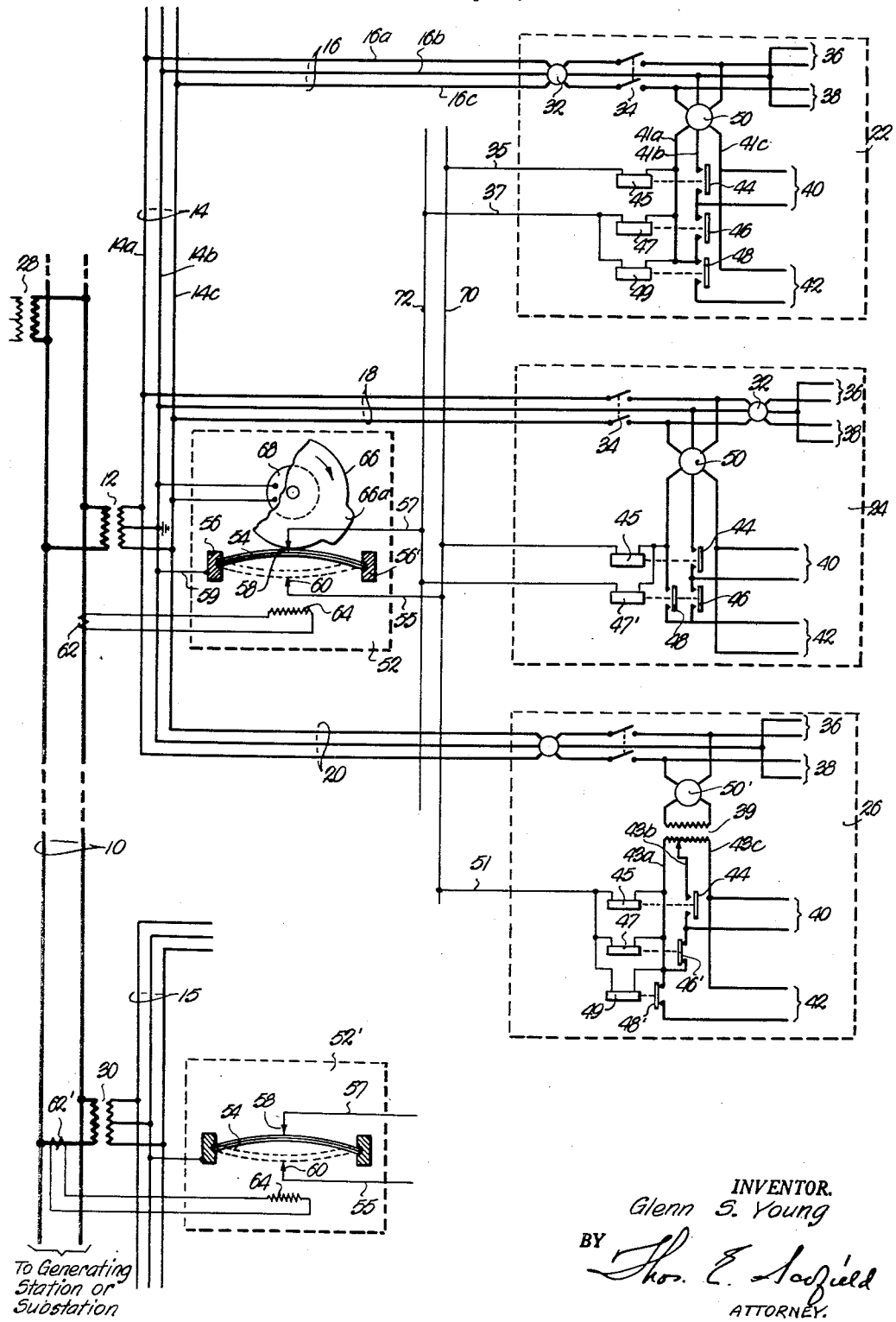

2,771,558

ELECTRIC POWER SUPPLY SYSTEM AND METHOD OF CONTROLLING SAME

Glenn S. Young, Kansas City, Kans.

Application July 19, 1954, Serial No. 444,273

16 Claims. (Cl. 307—35)

The present invention relates in general to electric power systems of the public utlity type, and it deals more particularly with an improved method of and apparatus for controlling the supply of electric service over the distribution lines of such systems.

One of the major problems which has concerned electric utility companies over the years is an economic one stemming, in the case of each community or network of communities, from the necessity of providing generating facilities and distribution networks that are ample by a safe margin to meet periods of peak electrical demand, yet are used to full capacity only a relatively small portion of each day. Generating facilities which are idle or held in "stand-by" capacity during off-peak periods obviously produce no customer revenue, so considering the capital investment they represent, as well as the non-operating costs involved in holding them in reserve, the economic inefficiencies in a typical day's operation are all too glaringly apparent.

Nor is the situation improving. On the contrary, residential customers are installing and using more and more intermittently operated "convenience" equipment and appliances which require high kilowatt capacity when in operation but which use only a few kilowatt hours per year. This is particularly so in the central and northern sections of the country. Examples of such equipment include room-type (¾ to 1 horsepower) and central (3 to 5 horsepower, and higher) air conditioning units that, because of the high motor starting currents involved, require larger secondary conductors and transformers in order to avoid voltage disturbances that otherwise would cause dimming lights and faulty television reception. Electric clothes driers enjoy greater public acceptance than electric water heaters—and a clothes drier represents about twice the connected load of the average water heater, yet uses less than one fourth the number of kilowatt hours on an annual basis. When contrasted with the longer hour-use of lighting, refrigeration (¼ horsepower) and deep freezers (⅓ horsepower), it is apparent that the trend is toward appliances with higher kilowatt ratings but lower kilowatt-hour use.

In utility parlance this means a lower system load factor or higher peak loads and less hours of use. Stated differently, it represents more kilowatts of capacity with less kilowatt-hours in proportion—and kilowatts of capacity are much more costly to supply than kilowatt-hours. Therefore, one of the major problems confronting electric utilities is to create and encourage markets for kilowatt-hours that can be manufactured and delivered by existing facilities or minor additions thereto. Only by so doing can more of the utility's gross revenues become net revenues.

The present invention is directed to this problem, and its need is particularly evident in connection with supplying electric service to residential customers. There is an increasing demand for the all-electric home, which includes house heating and water heating in addition to the use of clothes driers, air conditioners and the more common applications and appliances that are a part of modern living. However, existing rates make the use of electricity for house heating and water heating prohibitively expensive from the point of view of most customers. This may best be understood if it is realized that the present national average use of electric energy by residential customers is 2,300 kilowatt-hours per year, while the all-electric home, in an area with a 5,000 degree day heating season, will consume approximately 25,000 kilowatt-hours per year, or more than ten times the present average.

To meet competition in the house heating and water heating market, the utility company must sell electric energy for around 1¢ to 1½¢ per kilowatt-hour. With the many advantages of electric heat, there is a very large market for it at this price in the case of houses that are well insulated.

But the all-electric home creates problems for the utility that, at the present time, are far from conducive to the sale of low-cost electric energy. The average size, well-insulated house will require 12 to 15 kilowatts in heating elements to maintain desired temperature in cold weather. This is 4 or 5 times the present demand load of the average residential customer. Now, electricity cannot be stored economically but must be manufactured, delivered and used instantaneously; since the utility therefore must have a manufacturing and delivery system with adequate capacity to supply the peak load conditions (and with adequate reserve capacity for normal load growth) it is readily apparent that a house heating market of only 10% saturation would require the utility to increase its investment for additional facilities to serve the load, if the house heating load is unrestricted as to time of use. Such added investment, in view of prevailing high prices for equipment, labor, fuel and taxes plainly is not conducive to lower rates for service.

Accordingly, it is most important for the utility to satisfy this vast potential market with existing facilities or with a minimum addition of new facilities, since fixed charges on investment represent one of the major costs of electric utility operation. With this and other factors in mind, the fundamental objective of my invention to enable the utility to so control the utilization by its customers of certain of its electric energy output as to greatly improve the economic efficiency of operation with a commensurate reduction in the cost of the energy utilized by the customer under such control.

Stated differently, it is my purpose to enable a utility supplying the customary type of electric service to supplement such service with an additional or auxiliary type of electric service that is automatically controlled with respect to the time of delivery to the consumer's utilization equipment.

Broadly speaking, the object of the present invention, therefore, is to provide a method of and apparatus for controlling the time of delivery of electric service to certain classes of consumer's utilization equipment; such utilization equipment may consist principally of electric heating elements of the resistance type, but this invention is not necessarily limited to electric heating equipment.

More specifically, the object of the invention is to so control the supply of electric service to certain classes of consumer's utilization equipment that during periods of peak demand, the utility's generating and distribution facilities will automatically be relieved of all or part of the load that might otherwise be imposed thereon by the classes of equipment in question, the delivery of service to such equipment being deferred or curtailed until the peak period is past in order to obtain a more uniform distribution of the total load imposed upon the generating facilities in the course of any 24-hour day. As previously suggested, there are many types of electrical utilization equipment that can function on this conditionally deferred basis with little or no inconvenience to the consumer—complete house heating systems, auxiliary room heaters, clothes driers, water heaters and garbage incinerators, to mention a few.

By controlling the energy input to certain types of consumer's utilization equipment so that such energy input will occur at times when off-peak capacity is available in the utility's generation and distribution system, the utility can make far greater and more efficient use of its facilities; this in turn will increase the utility's system load factor or the number of hours per year the system facilities are used, with a resultant increase in net revenue. Also, so far as the use of electricity for house heating is concerned, it will improve the utility's competitive position with respect to other fuels.

It is a feature of my invention to provide customers served by a common distribution network with an auxiliary service of the character referred to hereinbefore, which service is controlled in accordance with the magnitude of the total current drawn by the network from a main feeder circuit—or which may, if desired, be controlled in accordance with the magnitude of the current flowing through said feeder circuit to a group of distribution networks including the one in question.

In connection with the aforementioned control facilities, a further feature resides in the provision when it is advantageous to do so, of an overriding control based upon the pattern of the total electrical demand to which the generating facilities of the community are subjected, which demand pattern may vary from day to day and month to month.

According to my invention, the auxiliary service contemplated herein can be provided in one or both of two forms. In the first form, the normal service is interrupted during periods of peak demand and restored when the peak demand has passed so that the service is in effect deferred in point of time. In the second form the auxiliary service is curtailed or restricted during periods of peak demand but not completely interrupted, and in connection with the latter form of service, it is another feature of the invention to provide means for variably adjusting the extent to which the service shall be so curtailed.

Still another feature resides in the provision of a novel form of control apparatus for the auxiliary service, which apparatus is so governed by the magnitude of the current flow in a primary feeder circuit (or from a primary feeder to a distribution network) that as the current rises above a predetermined value or drops below that value, it will correspondingly alter the condition of the auxiliary service.

A further feature resides in the optional provision in the last mentioned apparatus of novel time-controlled means for altering the condition of the auxiliary service independently of the control exerted by the feeder current flow.

In brief, the invention contemplates the use of variations of the ampere load or current flow in the utility's feeder for actuating switch mechanisms in a customer's circuit that in turn control the voltage on such utilization equipment as heating elements, and in so doing control the load or wattage drawn by such equipment. It is well known that the wattage or power drawn by resistive loads varies in geometric ratio to the impressed voltage or, stated differently, that the wattage input varies as the square of the impressed voltage.

The invention can best be understood by reference to the single figure in the drawing which comprises a schematic diagram of a portion of a power distribution system or network embodying my invention.

Referring more particularly to the diagram, the numeral 10 indicates a conventional high-voltage primary feeder to which the generating station or substation supplies alternating current energy at, let us say, 2,400 v. (It should be understood that this voltage and the other voltages referred to hereinafter are intended only to be illustrative and not limiting.)

Through the stepdown transformer 12, the primary feeder supplies energy to a low-voltage distribution network comprising a secondary feeder 14 having branch lines such as 16, 18 and 20 extending to the premises of individual consumers such as 22, 24 and 26. The distribution network is of the conventional three-wire type, the full voltage in the secondary winding of transformer 12 (which will be assumed to be 230 v. A. C.) being impressed across the outer conductors of the secondary feeder and the various branch lines. Half of this voltage (115 v.) is available between either one of the outer conductors 14a or 14c and the neutral center conductor 14b, the latter being connected to a grounded center tap on the secondary winding of transformer 12 as shown. Other low voltage distribution networks similar to the one described are independently connected to the primary feeder by means of stepdown transformers such as 28 and 30.

At the premises of consumer 22, the branch line 16 is connected through a watt hour meter 32 and a main switch or circuit breaker 34 to a pair of 115 v. circuits 36 and 38. Conventional unrestricted, continuous service is available on each of these lines, and to them it is contemplated the consumer will connect such electrical equipment as will not admit of deferred or curtailed service (e. g., lamps for household illumination, electric stoves, small appliances, etc.).

My auxiliary service is available to the consumer at lines 40 and 42; for convenience line 42 can be termed a "deferred" service line, while line 40 is a "modified-deferred" or "curtailed" service line. By this is meant that while in off-peak periods unrestricted service is continuously available at lines 40 and 42, the service at line 42 will be completely interrupted during periods of peak demand and resumed only when the peak has passed; the service at line 40, on the other hand, will be continued through peak periods, but on a restricted or curtailed basis.

It should be understood that in a given case only the "deferred" service line or only the "curtailed" service line may be required to satisfy the consumer's needs, and in such instances, the unneeded line may be omitted. However, under some circumstances, it will be desirable to provide the consumer's premises with both auxiliary service lines, and such will be assumed to be the case here. For the sake of illustration, then, let it be assumed that an electrically heated incinerator and a clothes drier are connected to line 42, since a considerable time-lag in the operation of these devices will result in little or no inconvenience to the consumer; also, let it be assumed that an electric water heater and one or more radiant space heaters for various rooms in the consumer's dwelling are connected to line 40 in order to avoid the possibility of there being a longer sustained interruption of service to these devices than can be bridged by "carry-over" heat generated by the devices prior to the interruption.

Actually the latter precaution is rarely necessary in the case of domestic water heaters due to their ample heat storage capacity. More often than not, a water heater will give very satisfactory service when connected to line 42. Similarly, it should perhaps be mentioned that house heating and room heating equipment may best be connected in some instances to line 40 and in other instances, to line 42, depending upon the type of system employed and other factors involved in the installation. Space heating systems which will use electric energy most efficiently include 1. Direct resistance types, such as resistors carried in rubber panels or glass panels, resistors in walls, ceilings or floor, radiant heaters, convection heaters and other variations of resistance type heating elements.

2. Hot water systems (or systems using other storage medium) of the panel type installed in walls, ceiling, floor or baseboards, preferably using forced circulation. (Hot water systems may be heated by immersing electric heating elements, for example, and such systems when properly designed have ample heat storage capacity for considerable "carry-over" into or through periods of interruption in the supply of electric energy.)

3. Hot water or other heat storage mediums as auxiliary heat in systems employing heat pumps as the primary source of heat. Direct resistance heating also may be used for auxiliary heat in heat pump systems, which at the present stage of development have difficulty in maintaining temperatures when the outside temperature falls below 20° F.

As indicated, the power consumed over the auxiliary service lines 40 and 42 is measured separately at the watt hour meter 50 in order to facilitate charging therefor at a lower rate than that established for the continuous unrestricted service lines 36 and 38. Delivery of electric energy to lines 40 and 42 is controlled by contactors 44, 46 and 48 which are solenoid actuated under control of the unit shown schematically at 52.

The control unit 52 is common to the various consumers' premises and preferably is mounted in close proximity to the stepdown transformer 12. It employs a snap-acting bimetal element 54 supported by blocks 56 and 56'; normally, the bimetal element occupies the position shown in solid lines, thus engaging contact 58, but upon having its temperature raised to a predetermined value, it will rapidly reverse its position, as shown by dotted lines, to engage contact 60. The temperature of the bimetal element is governed by a resistance heater 64 which receives the output of a current transformer 62, the latter being inductively coupled with one of the conductors of the primary feeder 10 as indicated.

The output of the current transformer is, of course, at all times proportional to the current flowing in the feeder conductor, so this transformer serves in effect to continuously meter the current drawn from the primary feeder via stepdown transformers 10 and 28, as well as stepdown transformers leading to any other distribution networks connected to the primary feeder at points spaced beyond the point at which the current transformer is located. The heat generated by resistor 64 will therefore vary instantaneously with the aforementioned feeder load current, and it is so designed as to cause the bimetal element 54 to be flexed upwardly whenever the feeder load current is below (and to be flexed downwardly whenever the feeder load current is above) a predetermined critical value, this value being arbitrarily selected by the utility company on the basis of the limit to which it can permit my auxiliary service to load the primary feeder.

While for convenience I have shown a separate heater coil 64 for the bimetal element, it will be understood that in accordance with conventional practice, the resistance of element 54 itself can be used in lieu of a separate resistance heater. Associated with the bimetal element, there is a time control cam disc 66 which conveniently may be driven, at a slow rate of speed through suitable gearing, by a synchronous motor 68. The purpose of the disc will be explained presently.

Let us now consider the operations which take place at consumer's premises 22 when the master switch or circuit breaker 34 is closed. In addition to energizing the conventional continuous service circuits 36 and 38 as described hereinbefore, solenoids 47 and 49 are energized over a circuit extending from the lower side of the secondary winding of transformer 12 via conductors 14c and 16c, meter 32, switch 34, meter 50, conductor 41a, the windings of solenoids 47 and 49 in parallel, conductors 37, 72 and 57, contact 58, bimetal element 54, block 56 and conductor 59 to the grounded center tap on the secondary winding of transformer 12. The solenoids 47 and 49 therefore operate and close contactors 46 and 48; contactor 48 connects the lower conductor of line 42 to conductor 41a and conductor 46 likewise connects the lower conductor of line 40 to line 41a. The upper conductor of each line is connected directly to conductor 41c, so lines 40 and 42 are both energized at 230 v. A. C., and the appliances connected to those lines are free to draw power therefrom in the usual fashion. The power thus used is, as previously suggested, low-cost power metered by the auxiliary service watt hour meter 50.

Now, in the event that while appliances connected to one or both of the auxiliary service lines are in operation, the feeder current metered at current transformer 62 (representing the power drawn from the primary feeder 10 through transformer 12, plus that drawn by networks similar to the one shown through transformers such as 28) exceeds the predetermined maximum value established by the utility company, bimetal element 54 will reverse its position as explained hereinbefore, opening contact 58 and closing contact 60. The opening of contact 58 interrupts the previously described circuit for solenoids 47 and 49, causing contactors 46 and 48 to open. The service to line 42 is immediately interrupted by the opening of contactor 48, and the opening of contactor 46 serves to interrupt the 230 v. service previously available at line 40.

The closing of contact 60 completes a circuit extending from the lower end of the secondary winding of transformer 12 through conductors 14c, 16c, meter 32, switch 34, meter 50, conductor 41a, the winding of solenoid 45, conductors 35, 70 and 55, contact 60, bimetal element 54, block 56 and conductor 59 to the grounded center tap on the secondary winding of transformer 12; the energization of solenoid 45 via this circuit closes contactor 44 which in turn connects the lower conductor of line 40 to the neutral center conductor 41b. Accordingly, unlike the service on line 42 which is completely interrupted responsive to the shifting of bimetal element 54, the service on line 40 is continued but at half voltage (115 v. A. C.). The appliances connected to line 40 are now operating on curtailed service, which is to say that due to the reduction in the impressed voltage, they will draw only one fourth of their normal power, and the load which they impose on the primary feeder 10 is correspondingly reduced without the complete interruption of service to the consumer.

The foregoing condition of operation will obtain until such time as the feeder current metered at current transformer 62 drops to the critical value which, by reducing the temperature impressed by heater 64 on bimetal element 54, causes the latter to restore to its solid line position. When this occurs, the opening of contact 60 interrupts the circuit for solenoid 54, opening contactor 44; and the closing of contact 58 re-energizes solenoids 47 and 49 which by closing contactors 46 and 48 restores full 230 v. service to lines 40 and 42.

It may sometimes happen that at the time of day when the utility's generating facilities as a whole are subjected to peak demand, the load on feeder 10 remains relatively light or moderate. Under such circumstances the temperature of the bimetal element 54 will not, of course, be raised high enough to cause it to shift to its dotted-line position, yet it is desirable that the bimetal element do so in order to bring about the previously described curtailment or deferral of the auxiliary service on lines 40 and 42 for the purpose of somewhat relieving the general load imposed on the generating facilities. It is for this purpose that I have provided the time-controlled cam disc 66.

For simplicity, disc 66 has been illustrated as a "one-day" disc (making one revolution in each 24-hour period) and on it there is a single lug 66a whose location and width in a circumferential direction corresponds to the expected time and duration of the peak load for the day. Thus at the proper time, the advance of the disc will bring lug 66a into engagement with the bimetal element 54, deflecting it overcenter to its dotted line position. When that occurs, the same operations as already described ensue, that is to say, contactors 46 and 48 are opened to interrupt the auxiliary service normally available at line 42 and contactor 44 will close, placing line 40 on limited or curtailed service to reduce the power drawn therefrom. When the period of peak demand has passed, lug 66a will have advanced to a point where the bimetal element 54 can restore to its solid line position, causing the service interrupted at line 42 to be resumed and causing full 230 v. service to be restored to line 40.

While in the interest of simplicity I have shown disc 66 as a "one-day" disc, I prefer, in actual practice, that it be a "seven-day" disc with circumferentially spaced lugs corresponding to the peak load periods for the successive days of the week. The reason for this will be self-evident to those versed in the art, inasmuch as peak load conditions vary from day to day through the week, each day having its individual pattern, and mid-week days differing widely, for example, from those at the week end due to differences in the activities in the community. Also, inasmuch as the load pattern on the generating facilities changes from month to month and from season to season, it is contemplated that the weekly cam discs in the unit 52 will be changed periodically in accordance therewith.

It will be understood that the circuits at consumer's premises 24 and 26 can be identical to those shown at premises 22, but in each case, a variant form of consumer's circuit has been shown in order to illustrate certain modifications contemplated by and within the scope of my invention.

In the case of consumer's premises 24, the supply of auxiliary service to lines 40 and 42 is controlled by contactors 44, 46, and 48, which function in precisely the same manner as has been described in connection with consumer's premises 22, the only difference being that contactors 46 and 48 are actuated by a single solenoid 47' rather than by two separate solenoids connected in parallel as was true in the case of premises 22. The mode of operation therefore will be obvious from the previous description. The only other difference between the two premises resides in the fact that the watt hour meter 32 at consumer's premises 24 has been shifted to a position wherein it meters only the power drawn over the continuous service lines 36 and 38, whereas the watt hour meter 32 at premises 22 meters the total power drawn by the consumer; either metering arrangement can be employed, depending upon the preference of the utility company.

In the case of consumer's premises 26, the delivery of my auxiliary service to lines 40 and 42 is controlled by contactors 44, 46' and 48', the first of these being a normally open contactor and the remaining two being normally closed. The contactors are actuated by solenoids 45, 47 and 49, whose windings are connected in parallel as shown, so that all are adapted to be energized via the single control conductor 70 whenever contact 60 is closed. Normally, of course, contact 60 is open due to bimetal element 54 being in its solid line position. Consequently, under normal conditions, the lower conductor of line 40 and the lower conductor of line 42 are connected (by contactors 46' and 48', respectively) to one end of the secondary winding of the transformer 39, the upper conductors of both lines being connected directly to the opposite end of the winding. Transformer 39 is a 1 to 1 ratio transformer whose primary winding is connected via the two-wire watt hour meter 50' to the outer conductors of branch line 20, so it will be seen that power normally is supplied to the auxiliary service lines 40 and 42 at the full 230 v. level.

Now, whenever the bimetal element 54 shifts to its dotted line position, either under control of the cam disc 66 or under control of the heater 64 as a result of a rise in the feeder current metered at the current transformer 62, a circuit is completed from the midpoint of the secondary winding of transformer 39 (which may be assumed to be grounded) through the left-hand half of the winding, conductor 43a the windings of solenoids 45, 47 and 49 in parallel, conductors 51, 70 and 55, contact 60, bimetal element 54, block 56, and conductor 59 to the grounded center tap on the secondary winding of transformer 12. This causes all three solenoids to operate, closing contactor 44 and opening contactors 46' and 48'. The opening of contactors 46' and 48' interrupts the 230 v. service to lines 40 and 42, while the closing of contactor 44 connects the lower conductor of line 40 to an adjustable tap on the secondary winding of transformer 39. If this tap is at the midpoint of the secondary winding, line 40, will, of course, be energized at half the original voltage (i. e., 115 v.) as was true in the cases of consumers' premises 22 and 24; however, the tap may be adjusted offcenter as shown in order that the curtailed service voltage applied to line 40 is either less or more than 115 v. This affords, in other words, a means for adjusting the power which will be drawn by the appliances connected to the line 40 during periods of curtailed service thereon. When the bimetal element 54 restores to its solid line position opening contact 60, the solenoids 45, 47 and 49 are de-energized, restoring lines 40 and 42 to full 230 v. service.

It should be understood that the various arrangements of solenoid actuated contactors which are employed at the three premises are interchangeable, and it also will be readily appreciated by those versed in the art that the same switching functions can be achieved by still other contactor arrangements. By the same token, it is optional whether, in the case of each consumer, a transformer such as 39 is employed in order to obtain flexibility of the reduced voltage supplied to line 40 during periods of curtailed service, this arrangement being interchangeable with the fixed voltage arrangements shown in connection with consumers' premises 22 and 24.

In the lower portion of the diagram, I have shown a small portion of another low voltage distribution network similar to the one shown more fully above; this includes a secondary feeder 15 which is connected to the high voltage primary feeder 10 by means of the stepdown transformer 30. Auxiliary service, as described hereinbefore, is available to the consumers whose branch lines are connected to the secondary feeder 15, such service being controlled by the unit 52'. The latter is exactly like control unit 52 except that it has no time-controlled cam like 66. It should be understood, in other words, that the time-controlled cam 66 and the synchronous motor 68 for driving same could be omitted from the control unit 52, if desired, so that the position of bimetal element 54 is always determined solely by its temperature under the control of a heater 64. The additional control exercised by a cam like 66 is optional, being employed where there is such a disparity between the load conditions on the generating facilities as a whole and the load conditions on the primary feeder, as to make the dual control of the bimetal element desirable.

The only other important difference illustrated in connection with the control unit 52' resides in the fact that the current transformer 62' used to energize the heater 64 is mounted on one leg of the primary winding of transformer 30 rather than on one conductor of the feeder 10. This arrangement is employed where it is desired to have the operations of control unit 52' determined solely by the current drawn from the primary feeder through transformer 30 rather than being determined by current flowing from the feeder to a plurality of distribution networks. Transformer 62' could of course be positioned like transformer 62, and vice versa, the arrangement used in each instance being determined by design and loading considerations involved in the feeder and distribution network system to which my invention is to be applied.

While, in connection with the provision of the auxiliary electric service contemplated by my invention, I have, by way of example, shown and described a preferred form of unit for controlling the service in accordance with the instantaneous loading of the feeder from which the service is drawn, it will be understood that other forms of control unit may be used. The salient novelty resides in the provision of means for continuously metering or otherwise sensing the magnitude of current flow through or from the feeder, and in dependence thereupon, causing the electric supply to the auxiliary service circuits to be unrestricted so long as the power load level on the feeder is below a critical value but changing over the auxiliary service circuits to a "deferred" or "curtailed" service condition responsive to that critical value being exceeded. It will be obvious to those versed in the art that the invention is applicable to poly-phase systems as well as to single phase systems; it is not limited to residential applications, but may be utilized by any customer of the utility in connection with space or process heating or any other application of a character which can utilize the variable voltage delivery or the deferred service delivery available from the utility's system.

By the same token, while I have shown my solenoid-actuated contactors as being located at the premises of the individual consumers (such location being preferred), it will be apparent that, if desired, the contactors could be pole-mounted, for example, near a stepdown transformer such as 12, in which case the consumers' auxiliary service lines would extend from the individual premises to the poles.

Inasmuch as many possible embodiments of the invention may thus be made without departing from the scope thereof, it is to be understood that all matter herein set forth or shown in the accompanying drawing is to be interpreted as illustrative and not in a limiting sense.

From the description herein given, it will be quite evident that my invention is advantageous both to the electric utility company and to its customers. From the viewpoint of the former, it provides a low-cost practical method and apparatus for enabling the utility to 1. Make greater use of existing facilities,
2. Accelerate the development of the all-electric home,
3. Create and develop the following fast growing markets for electric energy delivered on a conditionally deferrable or curtailable basis (a) domestic electric water heating which alone represents a vast market that can be developed quickly and at small expense to the utility, (b) electric house heating, complete or supplementary, (c) auxiliary heating to be used as a supplement for heat pump systems (d) absorption-type air conditioning systems that do not require large motors, thus minimizing expensive changes in distribution systems, and (e) many commercial and industrial applications that can use my "deferred" or "curtailed" service,
4. Obtain more gross revenue per dollar of invested capital and more net revenue available for dividends to attract capital,
5. Minimize the trend toward demand type rate structures for large residential customers, which are confusing to the customer and restrictive,
6. Meet competition of other fuels for many heating purposes.

From the standpoint of the utility's customers, my invention enables the customer to—

1. Enjoy the benefits of increased electrical living at costs competitive to other energy sources, among which are (a) cleaner, safer and more healthful heating systems requiring little maintenance or attention, (b) safe, automatic and adequate hot water supplies, (c) use of heat pumps for heating and cooling in any climate by using my auxiliary service as an energy source for supplementary heat, (d) safe, clean and healthful disposition of garbage with an electric incinerator.
2. Design and build simpler, better and less expensive housing structures in that (a) electric equipment takes small amount of space, (b) no basement or fireplace is necessary, (c) no heat ducts for radiation type systems,
3. Enjoy the benefits of electric heat for many commercial and industrial heating applications.

With the foregoing in mind, it will be seen that my invention is one well adapted to attain all of the ends and objects hereinbefore set forth, together with other advantages which are obvious and which are inherent to the invention.

It will be understood that certain features and subcombinations are of utility and may be employed without reference to other features and subcombinations. This is contemplated by and is within the scope of the appended claims.

Having thus described my invention, I claim:

1. In a distribution system for supplying electrical power to utilization equipment at different consumers' premises, a common feeder having branch lines extending to the different premises, a main feeder connected to said common feeder for supplying power thereto, a utilization line at one of said premises connected to the branch line at that premises for receiving power therefrom, means including said last branch line for normally energizing the utilization line at a voltage which is a predetermined fraction of the main feeder voltage, change-over means operable to reduce the utilization line voltage to a predetermined smaller fraction of the main feeder voltage, and current sensitive means controlled in accordance with the magnitude of the current flowing in said main feeder for automatically operating said change-over means whenever said current flow exceeds a predetermined value.

2. A distribution system as in claim 1 including an overriding control device for at times operating said change-over means independently of said current sensitive means.

3. In a distribution system for supplying electrical power to utilization equipment at different consumers' premises, a common feeder having branch lines extending to the different premises, a main feeder connected to said common feeder for supplying power thereto, a utilization line at one of said premises connected to the branch line at that premises for receiving power therefrom, means including said last branch line for normally energizing the utilization line at a voltage which is a predetermined fraction of the main feeder voltage, change-over means operable to reduce the utilization line voltage to a predetermined smaller fraction of the main feeder voltage, and current sensitive means controlled in accordance with the power load imposed on said main feeder by said common feeder for automatically operating said change-over means whenever said load exceeds a predetermined value.

4. A distribution system as in claim 3 including an overriding control device for at times operating said changeover means independently of said current sensitive means.

5. In a distribution system for supplying electric power to utilization equipment at different consumers' premises, a feeder common to said premises for supplying electrical energy to said utilization equipment, each premises having thereat a primary supply line for utilization equipment, at least one of said premises also having thereat a secondary supply line for utilization equipment, means connecting all of said supply lines to said feeder to receive energy therefrom, said connecting means including means at all times energizing said primary supply lines at a voltage which is a predetermined fraction of the main feeder voltage and normally energizing said secondary line at a voltage which is a predetermined fraction of the main feeder voltage, change-over means operable to reduce the secondary supply line voltage to a predetermined smaller fraction of the main feeder voltage, and current sensitive means controlled in accordance with the instantaneous value of the total current drawn from the feeder by all of said supply lines for automatically operating said change-over means whenever said current exceeds a predetermined value.

6. In a distribution system for supplying electrical power to utilization equipment at different consumers' premises, a feeder common to said premises for supplying electrical energy to said utilization equipment, each premises having thereat a primary supply line for utilization equipment, at least one of said premises also having thereat a secondary supply line for utilization equipment, all of said supply lines being connected to said feeder to receive energy therefrom, means at all times maintaining said primary supply lines at a voltage which is a predetermined fraction of the main feeder voltage, means normally maintaining said secondary supply line at a voltage which is a predetermined fraction of the main feeder voltage, change-over means operable to reduce the secondary supply line voltage to a predetermined smaller fraction of the main feeder voltage, and current sensitive means controlled in accordance with the instantaneous value of the current flow in said feeder at a point ahead of that at which the supply lines are connected thereto for automatically operating said change-over means whenever said current flow exceeds a predetermined value.

7. In a current distribution system for supplying electrical power to utilization equipment at different consumers' premises, a common feeder having branch lines extending to the different premises, a main feeder, a transformer connecting said common feeder to said main feeder for receiving power therefrom, a utilization line at one of said premises connected to the branch line for receiving power therefrom at a voltage which normally is a predetermined fraction of the main feeder voltage, change-over means operable to reduce the utilization line voltage to a predetermined smaller fraction of the main feeder voltage, a current transformer on the main feeder ahead of said first transformer whereby the output of said current transformer is influenced by the power drawn from the main feeder by said common feeder, and means controlled by the output of said current transformer for automatically operating said change-over means whenever such output exceeds a predetermined value.

8. In a current distribution system for supplying electrical power to utilization equipment at different consumers' premises, a common feeder having branch lines extending to the different premises, a main feeder, a transformer connecting said common feeder to said main feeder for receiving power therefrom, a utilization line at one of said premises connected to the branch line for receiving power therefrom at a voltage which normally is a predetermined fraction of the main feeder voltage, change-over means operable to reduce the utilization line voltage to a predetermined smaller fraction of the main feeder voltage, a current transformer on the main feeder ahead of said first transformer whereby the output of said current transformer is influenced by the power drawn from the main feeder by said common feeder, a bimetal element having a normal position, means for heating said bimetal element in accordance with the output of said current transformer, thereby to cause said element to move off normal responsive to said output reaching a predetermined value, and means for operating said change-over means responsive to such off normal movement of the bimetal element.

9. A distribution system as in claim 8 having time controlled means operatively connected to said bimetal element to move same off normal at predetermined times independently of said heating means.

10. A distribution system as in claim 9 wherein said time-controlled means comprises a disc adjacent said bimetal element, means for turning said disc at a uniform speed, and at least one cam on said disc for periodically engaging the bimetal element and moving same off normal.

11. In a distribution system for supplying electrical power to utilization equipment at different consumers' premises, a common feeder having branch lines extending to the different premises, a main feeder, a transformer connecting said common feeder to said main feeder for receiving power therefrom, a utilization line at one of said premises connected to the branch line at that premises for receiving power therefrom, means including said last branch line for normally energizing the utilization line at a voltage which is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, and current sensitive means controlled in accordance with the magnitude of the current flowing in said main feeder at a point ahead of said transformer for automatically operating said changeover means and said disconnecting means whenever said current flow exceeds a predetermined value.

12. In a distribution system for supplying electrical power to utilization equipment at different consumers' premises, a common feeder having branch lines extending to the different premises, a main feeder connected to said common feeder for supplying power thereto, a utilization line at one of said premises connected to the branch line at that premises for receiving power therefrom, means including said last branch line for normally energizing the utilization line at a voltage which is a predetermined fraction of the main feeder voltage, changeover means operable to reduce the utilization line voltage to a predetermined smaller fraction of the main feeder voltage, a second utilization line at one of said premises normally connected to the branch line at that premises to receive power but having means operable to disconnect same therefrom, and current sensitive means controlled in accordance with the power load imposed on said main feeder by said common feeder for automatically operating said changeover means and said disconnecting means whenever said load exceeds a predetermined value.

13. In a distribution system for supplying electric power to utilization equipment at different consumers' premises, a common feeder having branch lines extending to the different consumers' premises, a main feeder, a transformer connecting said common feeder to said main feeder for receiving power therefrom, each premises having thereat a primary utilization line, at least one of said premises also having a secondary utilization line normally connected to the branch line at that premises but having means operable to disconnect same therefrom, current sensitive means controlled in accordance with the magnitude of the current flowing in said main feeder at a point ahead of said transformer for automatically operating said disconnecting means whenever said current flow exceeds a predetermined value, and means maintaining the primary utilization line at each premises connected to the branch line at that premises at all times regardless of whether said secondary utilization line is connected to or disconnected from the branch line at its premises.

14. A distribution system as in claim 13 including an overriding control device for at times operating said disconnecting means independently of said current sensitive means.

15. In a distribution system for supplying electric power to utilization equipment at different consumers' premises, a common feeder having branch lines extending to the different consumers' premises, a main feeder, a transformer connecting said common feeder to said main feeder for receiving power therefrom, each premises having thereat a primary utilization line, at least one of said premises also having thereat a secondary utilization line normally connected to the branch line at that premises but having means for disconnecting same therefrom, current sensitive means controlled in accordance with the power load imposed on said main feeder by said common feeder for automatically operating said disconnecting means whenever said load exceeds a predetermined value, and means maintaining the primary utilization line at each premises connected to the branch line at that premises at all times regardless of whether said secondary utilization line is connected to or disconnected from its branch line.

16. A distribution system as in claim 15 including an overriding control device for at times operating said disconnecting means independently of said current sensitive means.

References Cited in the file of this patent

UNITED STATES PATENTS 2,469,645    Harper  ---------------- May 10, 1949